(12) United States Patent
Perez et al.

(10) Patent No.: US 9,299,267 B2
(45) Date of Patent: Mar. 29, 2016

(54) RESONANCE AND ARTICULATION TRAINER

(71) Applicants: Hector Antonio Perez, San Antonio, TX (US); Stephen Francis Giovanoni, Schertz, TX (US)

(72) Inventors: Hector Antonio Perez, San Antonio, TX (US); Stephen Francis Giovanoni, Schertz, TX (US)

( * ) Notice: Subject to any disclaimer, the term of this patent is extended or adjusted under 35 U.S.C. 154(b) by 24 days.

(21) Appl. No.: 14/468,550

(22) Filed: Aug. 26, 2014

(65) Prior Publication Data

US 2015/0096431 A1    Apr. 9, 2015

Related U.S. Application Data

(60) Provisional application No. 61/888,090, filed on Oct. 8, 2013.

(51) Int. Cl.
| | |
|---|---|
| G09B 15/06 | (2006.01) |
| G09B 15/00 | (2006.01) |
| G10D 7/12 | (2006.01) |
| G10G 7/00 | (2006.01) |

(52) U.S. Cl.
CPC ............... G09B 15/00 (2013.01); G10D 7/123 (2013.01); G10G 7/00 (2013.01)

(58) Field of Classification Search
USPC ...................................................... 84/470 R
See application file for complete search history.

(56) References Cited

U.S. PATENT DOCUMENTS

| | | | | |
|---|---|---|---|---|
| 471,389 | A * | 3/1892 | Lacey .................. | A61B 5/0871 600/540 |
| 1,354,212 | A * | 9/1920 | Rigg ...................... | A63B 23/18 601/41 |
| 2,383,553 | A | 8/1945 | Johnson | |
| D213,220 | S | 1/1969 | Fromkin | |
| 3,451,302 | A | 6/1969 | Lamart | |
| 3,477,133 | A | 11/1969 | Armato | |
| 3,558,795 | A | 1/1971 | Barcus et al. | |
| 3,571,480 | A | 3/1971 | Tichenor et al. | |
| 3,712,113 | A | 1/1973 | Roscoe | |
| 3,720,202 | A | 3/1973 | Cleary | |
| 3,853,034 | A | 12/1974 | Vale | |
| 3,988,956 | A | 11/1976 | Moeck | |
| 4,025,070 | A * | 5/1977 | McGill .................. | A63B 23/18 482/13 |
| 4,086,918 | A * | 5/1978 | Russo .................. | A61B 5/0875 482/13 |
| 4,119,007 | A | 10/1978 | Criglar et al. | |
| 4,138,105 | A * | 2/1979 | Hunger .................. | A63B 23/18 482/13 |
| 4,149,445 | A | 4/1979 | Wis | |
| 4,245,544 | A | 1/1981 | Holland | |
| 4,449,437 | A | 5/1984 | Cotton, Jr. et al. | |
| 4,485,559 | A | 12/1984 | Lorenzini | |

(Continued)

FOREIGN PATENT DOCUMENTS

| | | | |
|---|---|---|---|
| DE | 19950825 A1 | 5/2001 | |
| DE | 19950825 C2 | 10/2001 | |

(Continued)

*Primary Examiner* — Christopher Uhlir

(74) *Attorney, Agent, or Firm* — Gunn, Lee & Cave, P.C.

(57) ABSTRACT

A resonance and articulation training device that includes a body with an open end and a closed end. A vertical tube is attached to the body near the closed end, and a pellet is located within the vertical tube. One or more holes along the body may be used to adjust the amount of airflow needed to lift the pellet. A mouthpiece or head joint from a musical instrument may be attached to the open end. Generating a tone with the mouthpiece or head joint creates an airflow in the body. If the airflow is sufficient, it may lift the pellet.

5 Claims, 3 Drawing Sheets

(56) References Cited

U.S. PATENT DOCUMENTS

| | | | |
|---|---|---|---|
| 4,533,137 A | 8/1985 | Sonne | |
| 4,550,637 A | 11/1985 | Drelinger | |
| 4,739,987 A | 4/1988 | Nicholson | |
| 4,779,465 A | 10/1988 | Stearns et al. | |
| 4,798,122 A | 1/1989 | Gisler et al. | |
| 4,973,047 A * | 11/1990 | Norell | A63B 23/18 482/13 |
| 4,981,295 A | 1/1991 | Belman et al. | |
| 2,025,698 A | 6/1991 | Feller et al. | |
| 5,105,705 A | 4/1992 | Drelinger | |
| 5,357,975 A | 10/1994 | Kraemer et al. | |
| 5,403,966 A | 4/1995 | Kawashima et al. | |
| 5,459,280 A | 10/1995 | Masuda et al. | |
| 5,522,756 A * | 6/1996 | Barthold | A63H 33/00 446/193 |
| 5,749,368 A | 5/1998 | Kase | |
| 5,808,218 A | 9/1998 | Grace | |
| 5,929,361 A | 7/1999 | Tanaka | |
| 6,002,080 A | 12/1999 | Tanaka | |
| 6,570,077 B1 | 5/2003 | Goss | |
| 6,881,890 B2 | 4/2005 | Sakurada | |
| 7,055,520 B2 | 6/2006 | Swisa | |
| 7,161,077 B1 | 1/2007 | Fry et al. | |
| 7,375,270 B2 | 5/2008 | Abernethy | |
| 7,476,793 B2 | 1/2009 | Williams et al. | |
| 7,563,970 B2 | 7/2009 | Laukat et al. | |
| 7,786,372 B2 | 8/2010 | Sawada et al. | |
| 7,985,916 B2 | 7/2011 | Shibata | |
| 8,118,713 B2 | 2/2012 | Foley et al. | |
| 8,161,966 B2 | 4/2012 | Foley et al. | |
| 8,269,095 B1 | 9/2012 | Wallace | |
| 8,309,837 B2 | 11/2012 | Hashimoto | |
| 8,474,452 B2 | 7/2013 | Gumaste et al. | |
| 8,663,069 B2 | 3/2014 | Foley et al. | |
| 8,758,202 B2 | 6/2014 | Foley et al. | |
| 2007/0144336 A1 | 6/2007 | Fujii | |
| 2008/0289475 A1 | 11/2008 | Williams et al. | |
| 2008/0314226 A1 | 12/2008 | Shibata | |
| 2009/0288549 A1 | 11/2009 | Masuda et al. | |
| 2012/0240749 A1 | 9/2012 | Bjornson | |
| 2013/0204151 A1 | 8/2013 | Amirkhanian et al. | |
| 2013/0248784 A1 | 9/2013 | Rose | |

FOREIGN PATENT DOCUMENTS

| | | |
|---|---|---|
| EP | 2687156 A1 | 1/2014 |
| WO | 0048160 A1 | 8/2000 |

* cited by examiner

RESONANCE AND ARTICULATION TRAINER

CROSS-REFERENCES TO RELATED APPLICATIONS

This original nonprovisional application claims the benefit of and priority to U.S. provisional application 61/888,090, filed Oct. 8, 2013, which is incorporated by reference.

STATEMENT REGARDING FEDERALLY-SPONSORED RESEARCH OR DEVELOPMENT

Not applicable.

BACKGROUND

1. Field of the Invention

The invention relates to musical instruments. More specifically, the embodiments herein relate generally to resonance and articulation trainers for musical wind instruments.

2. Description of the Related Art

Students learning their first wind instrument often struggle with the basics of playing the instrument. For brass and woodwind players, the basics include flowing enough air into the instrument to make the proper tone quality and articulation between musical notes. Currently, these issues are best addressed by an experienced teacher during one-on-one instruction. Addressing these issues during a small or large group instruction focuses the instructor's attention on one or a few students while the others are left idle. Currently, there are no devices for addressing issues of airflow and/or articulation in a group setting.

BRIEF SUMMARY OF THE INVENTION

According to one embodiment of the present invention, a device is used for teaching proper airflow for resonance, articulation technique, or both. The device includes a body, a vertical tube, and a connector. The body includes an open end, a closed end, and at least one home located between the open end and the closed end. The vertical tube is connected to the body near the closed end. The vertical tube includes a pellet located within the vertical tube. The connector is configured to connect to the open end of the body and to receive a mouthpiece, a head joint, or both. The connector is configured to receive airflow from the mouthpiece or head joint and to pass the airflow to the body. The body is configured to receive the airflow from the connector, to vent at least a portion of the airflow through an uncovered hole, and to direct any remaining airflow to the vertical tube. The pellet is configured to rise in the vertical tube if the vertical tube receives sufficient airflow from the body. The pellet thereby provides a visual indication of the airflow from the mouthpiece or the head joint.

BRIEF DESCRIPTION OF THE FIGURES

FIG. 2 shows a schematic view of the embodiment of FIG. 1 with a connector for saxophones, large bore euphoniums and baritones, large bore trombones, tubas, and the like.

DETAILED DESCRIPTION OF CERTAIN EMBODIMENTS

Figure 1:
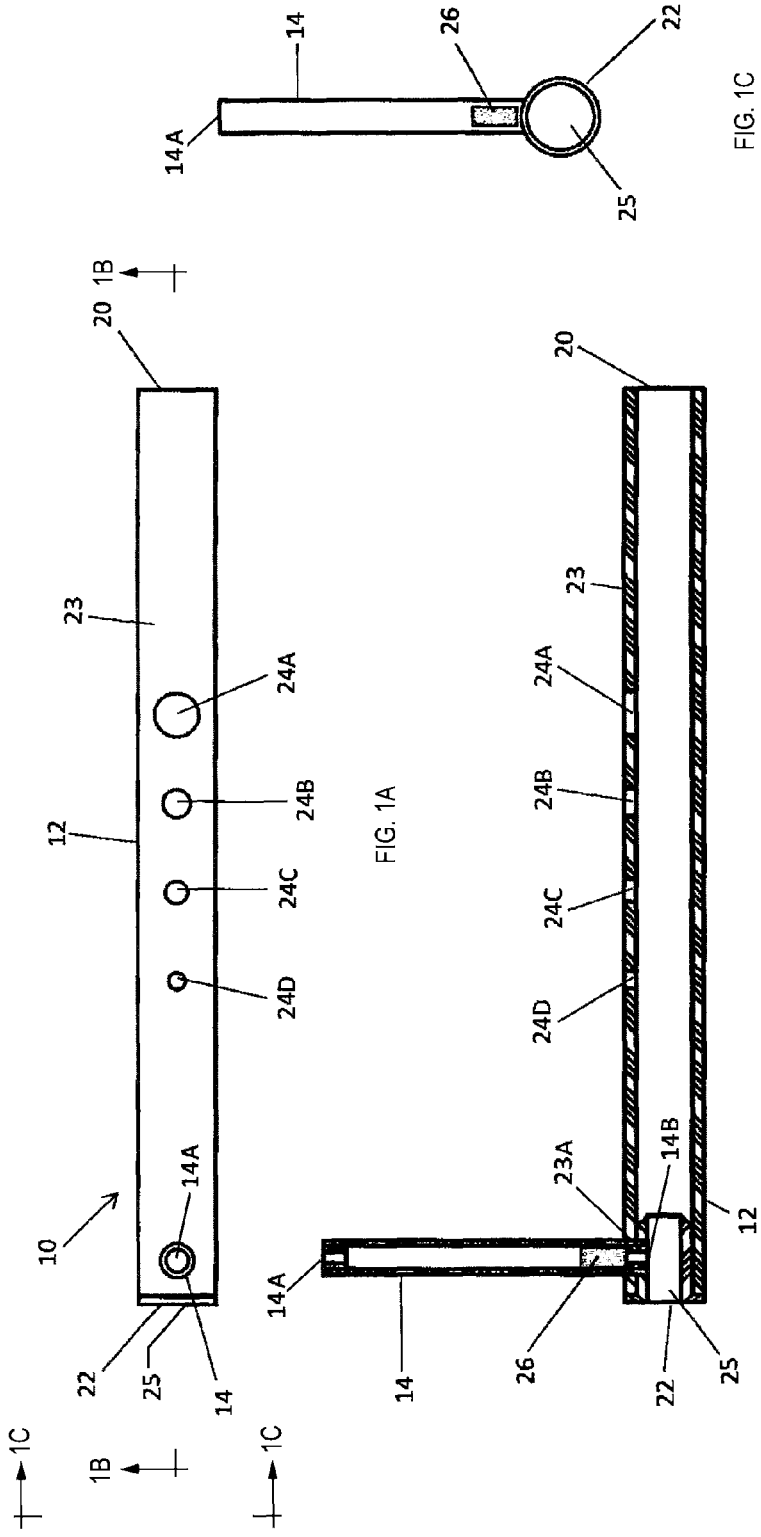
FIG. 1, which consists of FIGS. 1A-1D, shows a schematic view of one embodiment of the present invention.

By way of example, and referring to FIGS. 1A-1D, one embodiment of the present invention comprises a device 10 for measuring and displaying airflow. The device 10 may include a body 12 and a transparent, or at least partially transparent, vertical tube 14 near one end of the body 12.

The body 12 may include an open end 20, which may be opposite the vertical tube 14, and a closed end 22, which may be near the vertical tube 14. The body is formed of a cylindrical main tube 23 with openings on both ends and an end cap 25 attached at one end. The end cap 25 has a first cylindrical section 25A with an outer diameter corresponding to the outer diameter of the main tube 23 and a second cylindrical section 25B having an outer diameter corresponding to the inner diameter of the main tube 23. The second section 25B includes a cylindrical surface 25C defining a hole for receiving the vertical tube 14. The vertical tube 14 extends through an opening 23A in the main tube 23 and into the hole, where it frictionally engages with the surface 25C. In alternative embodiments, however, the vertical tube 14 may be connected to the end cap 25 or the main tube 23 using an adhesive.

The body 12 may include one or more holes 24, which have different sizes. For example, the largest hole 24A may be located closer to the open end 20. The smallest hole 24D may be located closer to the closed end 22. Intermediate holes 24B, 24C may be located between hole 24A and hole 24D, with the bigger intermediate hole 24B closer to the biggest hole 24A.

A pellet 26, which is preferably spherical, may be located in the vertical tube 14. The vertical tube 14 may be connected to the body 12 so that air from the body 12 may flow into the vertical tube 14. For example, if all of the holes 24 are covered, then only a relatively small airflow may be needed to lift the pellet 26 to the top of the vertical tube 14. The required airflow may be adjusted by uncovering one or more of the holes 24. An end 14A of the vertical tube 14 distal from the body 23 is closed, which prevents the pellet 26 from exiting the tube 14. A second end 14B of the vertical tube is in fluid communication with the body 12.

Figure 2:
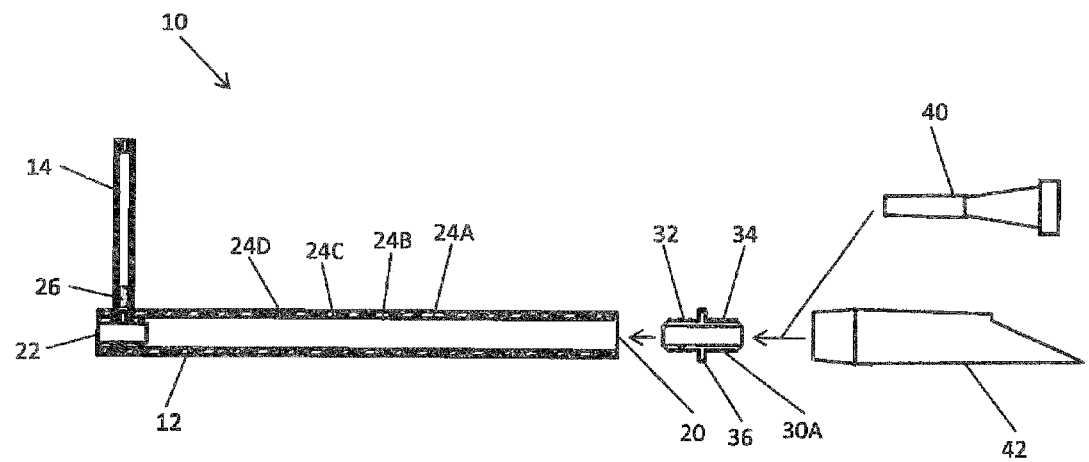

Referring to FIG. 2, the device 10 may include a connector 30A that connects to the open end 20 of the body 12. The connector 30A may include a ridged portion 32 that may be inserted into the open end 20 and form a substantially air-tight seal with the body 12. The connector 30A may include a smooth portion that is configured to connect to a mouthpiece 40, a saxophone mouthpiece 42, or other portion of a musical instrument mouthpiece. The ridged portion 32 and the smooth portion 34 may be separated by a stop 36, which may prevent the connector 30A from being inserted too far into the body 12 or a mouthpiece 42.

Figure 3:
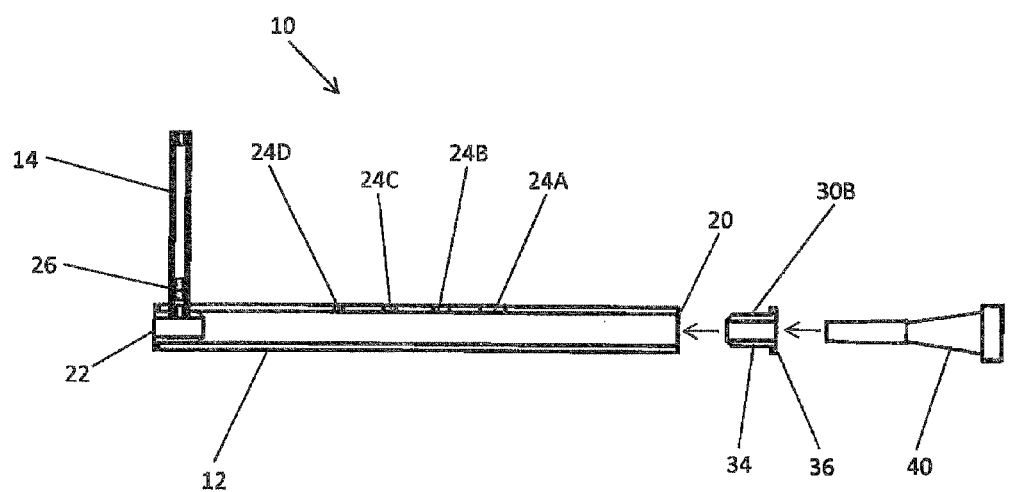
FIG. 3 shows a schematic view of the embodiment of FIG. 1 with a connector and a mouthpiece for trumpets, French horns, cornets, flugelhorns, and small bore euphoniums, baritones, and trombones.

Referring to FIG. 3, the device 10 may include a connector 30B that only includes a smooth portion 34, which may be inserted into the body 12, and a stop 36. The connector 30B may be configured to receive a mouthpiece 40 for an instrument such as a trumpet, flugelhorn, mellophone, cornet, small bore baritone, euphonium, or trombone.

The device 10 may be used by selecting a connector 30 appropriate to the current instrument being used. The connector 30 may be inserted into the body 12. A brass mouthpiece 40 may be inserted into the connector 30. Different connectors 30 may have differing inner diameters to accommodate different sizes and types of mouthpieces 40. A woodwind mouthpiece 42 may be fitted over the smooth portion of a connector 30A. A student may flow air into the mouthpiece 40 or saxophone mouthpiece 42 to generate a basic sound. One or more of the holes 24 may be uncovered, requiring the student to flow more air to lift the pellet 26 to the top of the vertical tube.

Additionally for brass players, the device 10 illustrates that higher tones result in less air flowing into the mouthpiece. The student must maintain the pellet 26 at the top of the vertical tube 14 regardless of how high or low the musical tone they are buzzing.

For articulation, a student may be able to visually see how she is flowing air between musical tones. For articulated notes, the pellet 26 should move slightly but not drop to the bottom of the vertical tube 14. For slurred/legato articulations, the pellet 26 should stay at the top of the vertical tube 14 without moving between musical tones. For staccato articulations, the pellet 26 may rise and fall briefly between tones, which may indicate separation of airflow between consecutive musical tones.

Figure 4:
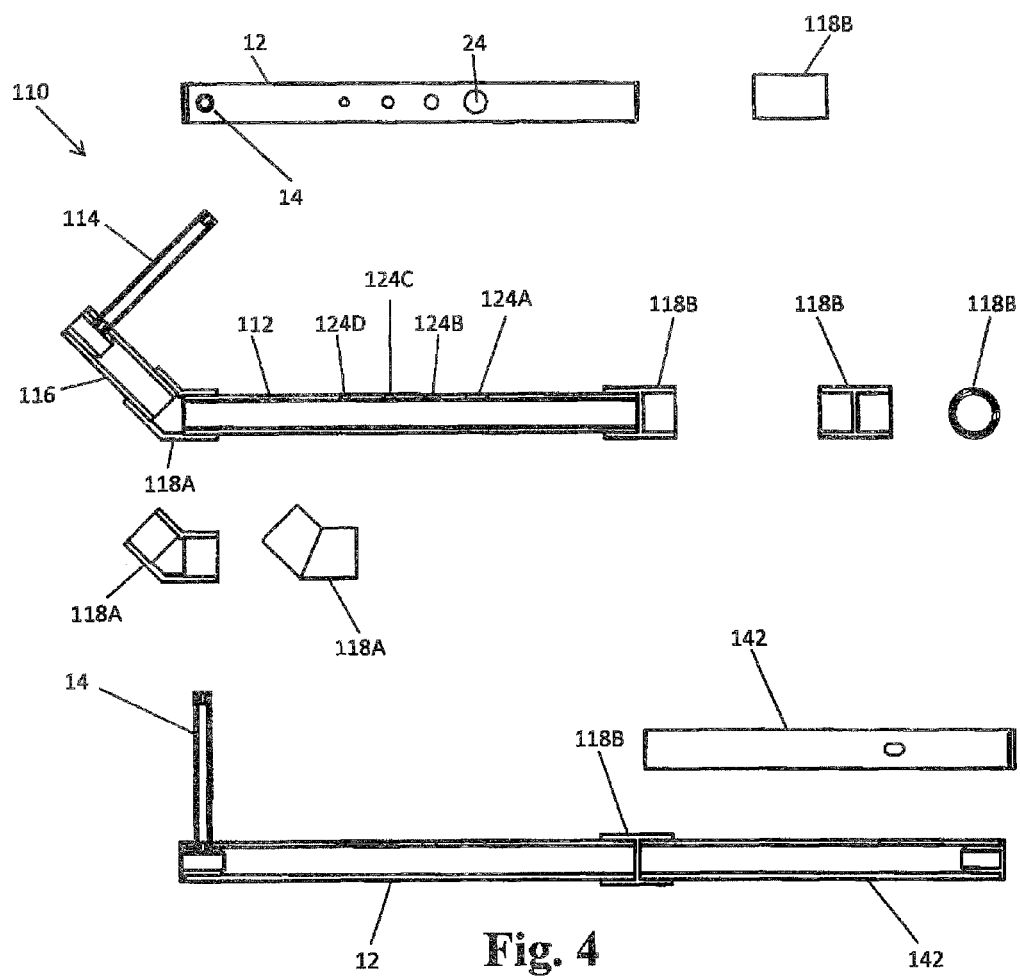
FIG. 4 shows a schematic view of an alternate embodiment of the present invention for clarinets and flutes.

Referring to FIG. 4, an alternate embodiment of the device 110 may include different styles and types of components for other instruments such as clarinets and flutes. For example, the device 110 may include a body 112 and a vertical tube 114, but the vertical tube may be connected to a stub 116. A connector 118 may join the stub 116 to the body 112. The connector may be a bent or elbow connector 118A or a straight connector 118B. The body 112 may include one or more holes 124. A connector 118 may be used to join the body 12 or the body 112 to another tube, such as, e.g., a flute head joint 142. The use of extensions, stubs 116, connectors 118, and similar components may allow students to easily view the vertical tube 14 or 114 while maintaining correct posture, alignment of the instrument and mouthpiece, and so on. In FIG. 4, the tube 114 is angled at forty-five degrees relative to the body 112.

Principals of general air flow as it pertains to performing a wind instrument can be taught using the present invention, with or without a mouthpiece adaptor. Using the adaptor develops an awareness of airflow as it pertains to a specific set of instruments, whereas exercises conducted without an adaptor develop awareness of general airflow as it pertains to all wind instruments.

To use the device, the device is inserted between the teeth to provide an open oral cavity and create an open airway. Inhaling and exhaling through the device with various holes covered or uncovered will change the physical workload of the lungs in order to build overall capacity and ability necessary for proper resonance as it relates to a wind instrument.

In addition, the position of the device relative to the player may isolate the development of either exhalation or inhalation. Exercises for developing exhalation can be practiced with the tube extending upward from the body, such that the player's exhalation must overcome the force of gravity to raise the pellet away from the body 12 toward closed end of the tube 14. Exercises for developing inhalation can be practiced with the indicator pointing down, such that the player's inhalation must overcome the force of gravity to raise the pellet from the closed end of the tube 14 toward the main body 12.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

We claim:

1. A device for teaching proper airflow for wind instruments, the device comprising:

a body comprising a main tube having an open first end, an open second end, an inner surface having an inner diameter, an outer surface having an outer diameter, a surface extending between the inner surface and the outer surface to define a first hole, an end cap positioned at one end of the main tube, the end cap having a first cylindrical section with a first diameter larger than the inner diameter and a second cylindrical section with a second diameter smaller than the inner diameter, the end cap having a cylindrical surface extending through the second cylindrical section to define a second hole axially aligned with the first hole;

a tube having an open end connected in fluid communication with the body;

a pellet within the tube; and a connector configured to connect to the open first end and to receive at least one of a mouthpiece and a head joint.

2. The device of claim 1 wherein an angle of the tube relative to the body is between thirty-five and fifty-five degrees.

3. The device of claim 1 wherein the tube is connected to the body near a closed end of the body.

4. The device of claim 1 further comprising a stub connected to the body at an angle, and wherein the tube is connected to the stub.

5. The device of claim 1 wherein the connector is configured to receive an airflow from a mouthpiece or a head joint and to pass the airflow to the body; the body is configured to receive the airflow from the connector, to vent at least a portion of the airflow through an uncovered hole, and to direct the remaining airflow, if any, to the tube; and the pellet is configured to rise if the tube receives sufficient airflow from the body, thereby providing a visual indication of the airflow from the mouthpiece or head joint.

* * * * *